(12) United States Patent
Ranade et al.

(10) Patent No.: US 11,151,103 B1
(45) Date of Patent: Oct. 19, 2021

(54) METHOD FOR PROVIDING AN INDICATION OF THE EXACT SEARCH HIT WITHIN A LARGE UNIVERSE OF CONTEXTUAL INFORMATION

(71) Applicant: Veritas Technologies LLC, Mountain View, CA (US)

(72) Inventors: Rujuta Ranade, Sunnyvale, CA (US); Michael J. Coyle, Los Altos, CA (US)

(73) Assignee: VERITAS TECHNOLOGIES LLC, Mountain View, CA (US)

(*) Notice: Subject to any disclaimer, the term of this patent is extended or adjusted under 35 U.S.C. 154(b) by 146 days.

(21) Appl. No.: 13/920,584

(22) Filed: Jun. 18, 2013

Related U.S. Application Data

(60) Provisional application No. 61/816,655, filed on Apr. 26, 2013.

(51) Int. Cl.
*G06F 16/22* (2019.01)

(52) U.S. Cl.
CPC .............................. *G06F 16/2228* (2019.01)

(58) Field of Classification Search
None
See application file for complete search history.

(56) References Cited

U.S. PATENT DOCUMENTS

| | | | |
|---|---|---|---|
| 5,873,076 A * | 2/1999 | Barr et al. | 704/270.1 |
| 5,875,446 A * | 2/1999 | Brown | G06F 17/30864 |
| 5,913,208 A * | 6/1999 | Brown et al. | 707/706 |
| 6,725,228 B1* | 4/2004 | Clark | G06Q 10/107 |
| 8,903,817 B1* | 12/2014 | Duggar et al. | 707/728 |
| 2006/0036659 A1* | 2/2006 | Capriati | G06F 17/30864 |
| 2006/0173824 A1* | 8/2006 | Bensky | G06Q 10/107 |
| 2008/0005090 A1* | 1/2008 | Khan et al. | 707/4 |
| 2009/0063472 A1* | 3/2009 | Pell et al. | 707/5 |
| 2009/0292681 A1* | 11/2009 | Wood et al. | 707/3 |
| 2012/0226760 A1* | 9/2012 | Lewis | H04L 51/08 709/206 |
| 2013/0325847 A1* | 12/2013 | Suchter et al. | 707/722 |
| 2014/0289223 A1* | 9/2014 | Colwell | G06F 17/30477 707/722 |

* cited by examiner

*Primary Examiner* — Giuseppi Giuliani
(74) *Attorney, Agent, or Firm* — Patent Law Works LLP

(57) ABSTRACT

A search system obtains a search result comprising an entry. The search result is based on a set of search constraints. The search system generates a hit index based on the search result and each constraint in the set of search constraints. The hit index includes identification information of an element associated with the entry that caused the entry to be included in the search result. The search system updates the search result to comprise an indication of the element associated with the entry based on the hit index.

16 Claims, 6 Drawing Sheets

METHOD FOR PROVIDING AN INDICATION OF THE EXACT SEARCH HIT WITHIN A LARGE UNIVERSE OF CONTEXTUAL INFORMATION

RELATED APPLICATIONS

This application is related to and claims the benefit of U.S. Provisional Patent application Ser. No. 61/816,655, filed Apr. 26, 2013, which is hereby incorporated by reference.

TECHNICAL FIELD

Embodiments of the present invention relate to electronic discovery, and more particularly, to a technique for providing an indication of the exact search hit within a large universe of contextual information.

BACKGROUND

Reviewers that review data sets, for example, during electronic discovery (e-discovery), may encounter data sets that contain millions of electronic discovery documents. Each of these electronic discovery documents may need to be evaluated by the reviewers and a binary determination may be made of a class or category for the documents. Categories may include confidential, not confidential, relevant, not relevant, privileged, not privileged, responsive, not responsive, etc.

A search system can implement a search of the electronic discovery documents. The electronic discovery documents may be searched, such as for a key term or phrase. The search system may provide search results including a set of electronic discovery documents that satisfy the search criteria. However, the electronic discovery documents that include an exact match for the search criteria may not be indicated in the search results.

SUMMARY

An exemplary search system may be programmed to providing an indication of the exact search hit within a large universe of contextual information. In one embodiment, the search system can obtain a search result comprising an entry. The search result can be based on a set of search constraints. The search system can generate a hit index based on the search result and each constraint in the set of search constraints. The hit index comprises identification information of an element associated with the entry that caused the entry to be included in the search result. The search system updates the search result to comprise an indication of the element associated with the entry based on the hit index.

In one embodiment, the set of search constraints comprises at least one of a document constraint or an item constraint.

In one embodiment, the search system generates the hit index based on the search result and each constraint in the set of search constraints by determining whether the attachment matches the item constraint upon determining that the entry is an attachment and the set of search constraints comprises an item constraint, determining whether an email associated with the attachment matches the document constraint upon determining that the attachment matches the search constraint and the search constraint comprises a document constraint, and including the attachment in the hit index upon determining that the email associated with the attachment matches the document constraint.

In one embodiment, the search system includes the attachment in the hit index by determining an identifier for the attachment and updating the hit index to be associated with the identifier for the attachment.

In one embodiment, the search system generates the hit index based on the search result and each constraint in the set of search constraints by determining whether the email matches the document constraint upon determining that the entry is an email and the set of search constraints comprises a document constraint and determining whether the email matches the item constraint upon determining that the email matches the document constraint and the set of search constraints comprises an item constraint, and including the email in the hit index upon determining that the email matches the item constraint.

In one embodiment, the search system includes the email in the hit index by converting the email to a corresponding item identifier and updating the hit index to be associated with the corresponding item identifier.

In one embodiment, the search system updates the search result to comprise an indication based on the hit index by determining an element associated with the entry that matches the hit index for each entry in the search result.

In one embodiment, the search system causes the updated search result to be displayed, wherein for each entry in the updated search result, the updated search result is displayed with a visual hit indicator for the element associated with the entry that matches the hit index.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Embodiments of the invention are directed to a method and system for providing an indication of the exact search hit within a large universe of contextual information.

An electronic discovery document can be an email or a file (e.g., text document, picture file, etc.). An electronic discovery document can be represented as a document family that includes one or more elements. Each element in the document family can be a distinct part of an electronic discovery document. For example, an electronic discovery document that is an electronic mail item (email) can be represented as a document family including an email message element, an email attachment element for each attachment associated with the email, and an email embedding element for each embedding (e.g., HTML, etc.) associated with the email. In another example, an electronic discovery document that is a file can be represented as a document family including a file element and a file embedding element associated with the file. Each element can represent a single item in a search system.

When a search query is submitted to a search system with electronic discovery documents, the search query can include a set of search constraints to use when performing the search. The set of constraints can include keywords, a date range, a participant, a language, a file size, a tag, etc. The search system can perform a search using the set of search constraints and the document families representing the electronic discovery documents to generate a search result. The search can include the document families that met the set of search constraints. However, the search result may not indicate which element(s) in the document families resulted in the exact search hit that caused the document family to be included in the search result.

Accordingly, aspects of the present disclosure provide, in the search result, an indication of which element or elements within a document family caused the document family to be included in the search result (e.g., the element or elements that specifically matched each search constraint in the set of search constraints). To provide the indication, a search result including a document family is obtained. The search result can be based on a set of constraints and the document family can include at least one element. A hit index is generated based on the search result and the set of constraints. The hit index represents the element in the document family that matched each constraint in the set of constraints. Based on the hit index, the search result is updated to include an indication of which element in the document family caused the document family to be included in the search result. The updated search result including the indication (e.g., a visual indication) can be provided in a user interface to be presented to a user.

Figure 1:
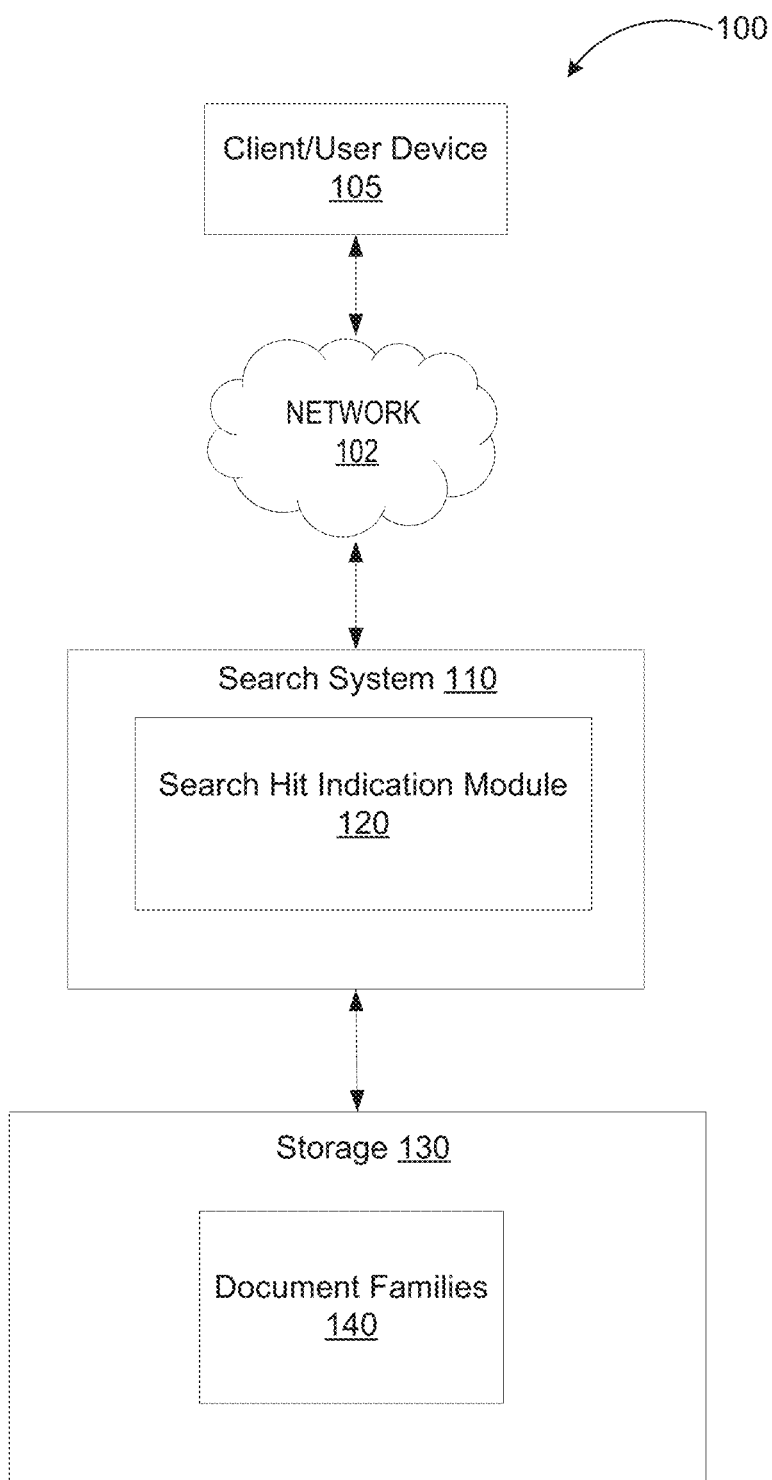
FIG. 1 illustrates exemplary system architecture, in accordance with various embodiments of the present disclosure.

FIG. 1 illustrates an example system architecture 100, in accordance with one embodiment of the present disclosure. System 100 comprises a client/user device 105 in communication with (e.g., coupled to) a search system 110 over a network 102, and a storage 130. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The client/user device 105 may be any type of computing device, for example, a device including a processor, a computer-readable medium, and a memory. In some embodiments, the client/user device 105 may be executing a browser application or other application adapted to communicate over Internet related protocols (e.g., TCP/IP and HTTP) and/or display a user interface. While only a single client/user device 105 is shown in FIG. 1, system 100 may support a large number of concurrent sessions with many client/user devices 105.

The search system 110 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single device or on multiple devices. Embodiments of the disclosure may operate as a standalone system.

In one embodiment, the search system 110 receives a search request from the client/user device 105. The search request can include a set of constraints, such as keywords, a date range, a participant, a language, a file size, a tag, etc. For example, the search system 110 may provide the search result to a user upon receiving a request from the user on the client/user device 105 via the network 102. The search system 110 obtains a search result based on the set of constraints. The search system 110 provides the search result based on the set of constraints to one or more of the client/user device 105.

Storage 130 can include one or more writable persistent storage devices, such as memories, tapes or disks. Although each of search system 110 and storage system 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Storage 130 may include document families 140. Document families 140 can be the document families associated with electronic discovery documents available to the search system 110. Document families 140 can include email document families, file document families, etc. Each document family in document families 140 can include elements of the electronic discovery document which the document family represents. For example, an email document family includes an email message element, an email attachment element for each attachment associated with the email, and an email embedding element for each embedding associated with the email. In another example, a file document family includes a file and a file embedding element associated with the file. Document families 140 can include emails and files that have been de-duplicated (e.g., based on a checksum) to avoid storing multiple copies of the same indexed content for large files. Two copies of the same file may even have different filenames, so the filenames can be indexed in an email index (not shown) rather than a file index (not shown). Document families 140 can include a "dummy" email created for each file to index its filename.

Each document family in document families 140 can include an identifier for each element in the document family that is based on the type of the element and an item identifier for each element in the document family. For example, for an email document family with an email and two attachments, the email has an email identifier and an item identifier, and each attachment has an attachment identifier and an item identifier. Therefore, the email document family will have one email identifier, two attachment identifiers, and three item identifiers (one for the email identifier and one for each attachment identifier).

During operation of system 100, a user accesses system 100 via client/user device 105 over network 102. The content server 110 receives communications from the client/user device 105, and processes and/or directs these communications accordingly.

As discussed above, conventionally, a search result includes document families that met or matched a set of constraints, but does not indicate the specific element or elements in the document families that met or matched the set of constraints.

Aspects of the present disclosure address the above deficiency of conventional systems. In particular, in one embodiment, in response to a user requesting a search with a set of constraints, the search system 110 provides the client/user device 105 with a search result based on the set of constraints to present to a user. In one embodiment, the search system 110 includes a search hit indication module 120 that obtains the search result including a document family from document family 140. The search result can be based on a set of constraints provided from client/user device 105 over network 102. The search system 110 can obtain the search result based on the document families 140 in storage 130.

The search hit indication module 120 can generate a hit index based on the search result and the set of constraints. The hit index is an index which stores identification information for the element or elements in a document family that matched each constraint in the set of constraints. The hit index represents the element or elements in the document family from document family 140 that matched each constraint in the set of constraints.

Upon generating the hit index, the search hit indication module 120 can update the search result based on the hit index. The search system 110 can update the search result based on the hit index to indicate the element in a document family included in the search result that matched each constraint in the set of constraints.

The search hit indication module 120 can provide the updated search result to the client/user device 105. The search system 110 can cause the updated search result to be presented in a user interface on client/user device 105. The search hit indication module 120 can cause the updated search result to be presented to include a visual indicator near or associated with each element in a document family that was a hit (caused the document family to be included in the search result).

Figure 2:
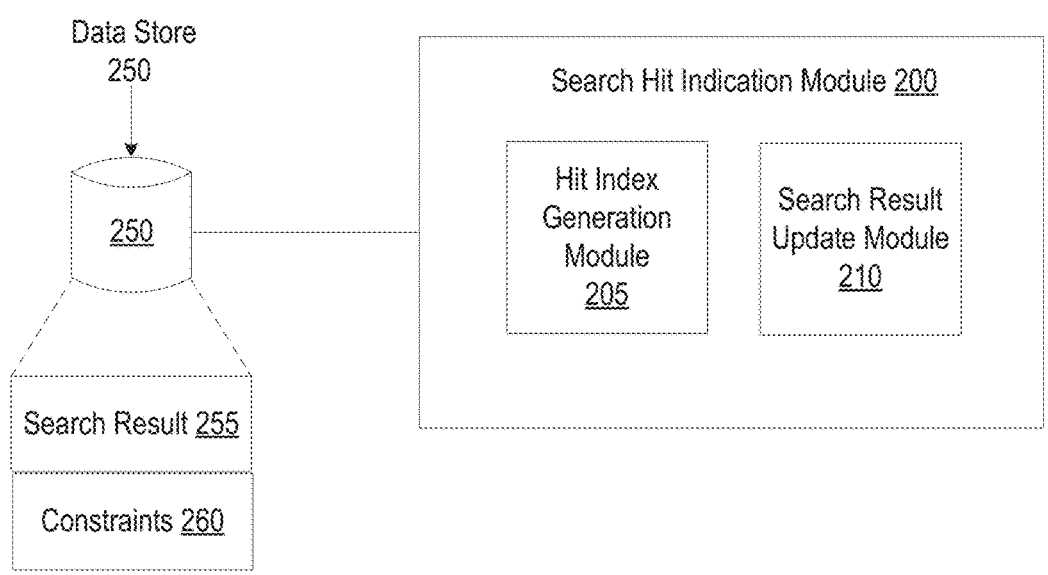
FIG. 2 is a block diagram of a search hit indication module, in accordance with an embodiment of the present disclosure.

FIG. 2 illustrates a search hit indication module 200, in accordance with one embodiment of the present disclosure. The search hit indication module 200 may include a hit index generation module 205 and a search result update module 210. More or less components may be included in the search hit indication module 200 without loss of generality.

The hit index generation module 205 may obtain a search result in response to a user request for a search based on a set of constraints, such as constrains 260. The hit index generation module 205 can generate a hit index based on the search result and the set of constraints 260. In one embodiment, the hit index generation module 205 obtains the search result from a data store, such as search result 255 in data store 250. In another embodiment, the search hit indication module 205 obtains the search result from other computing devices (e.g., other servers not shown in the figures, such as a datacenter) via a network (e.g., network 102 shown in FIG. 1) or may obtain the search result from a memory (e.g., a hard disk, flash memory, random access memory (RAM), etc.). The hit index generation module 205 can generate a hit index based generates a hit index based on the search results and each of the constraints in the set of constraints 260. The hit index can represent the elements in the document family included in the search result that match each of the constraints. For example, the set of search constraints includes constraints A, B, and C and the search results includes a document family with elements 1, 2, and 3. If element 3 matched constraints A, B, and C, but elements 1 and 2 did not, the hit index will include only element 3. The hit index can include an identifier for each element that specifically matched each of the constraints in the set of constraints.

The search result update module 210 can update the search result, such as search result 255 in data store 250, to create an updated search result that indicates the element or elements in each document family included in the search result that matches each constraint in the set of constraints. The search result update module 210 can update the search result by determining, for each document family (or entry) in the search result, an element associated with the document family that matches the hit index. The search result update module 210 can determine an element associated with the document family that matches the hit index by comparing an item identifier of each element associated with the document family to the entries in the hit index. If the item identifier associated with the element is associated with the index, the search result can be updated to include an indication for the document family of the hit as well as the element in the document family that caused the hit.

Figure 3:
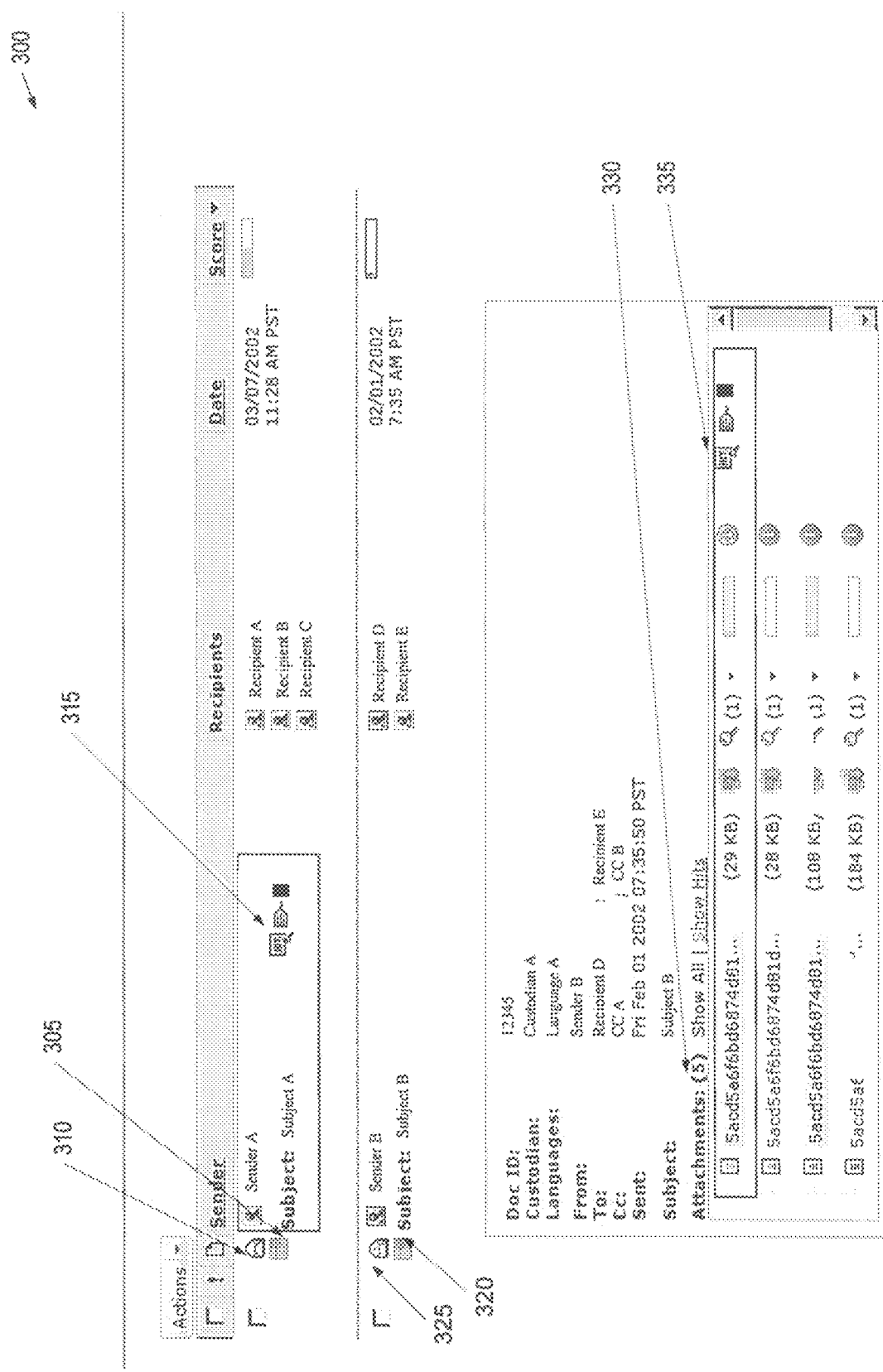
FIG. 3 illustrates a user interface, in accordance with one embodiment of the present disclosure.

FIG. 3 is an exemplary user interface 300 presented to a user to view a search result. The search result can include entries that are returned based on a search with a set of constraints. Each entry in the search result can be a document family that includes at least one element. In one embodiment, the user interface 300 includes a document family 305 and a document family 320 as the entries in the search result. The document family 305 includes an email 310 from Sender A with Subject A to Recipients A, B, and C. The email 310 is a hit based on the email 310 matching or meeting each constraint in the set of constraints associated with the search result. The hit is indicated to the user by the "hit" visual indicator 315.

The document family 320 includes an email 325 and attachments 330. The email 325 is from Sender B with Subject B to Recipients D and E. The first attachment in attachments 330 is a hit because the first attachment meets or matches each constraint in the set of constraints. The hit is indicated to the user by the "hit" visual indicator 335. The email 325 does not include a hit indicator because, although an attachment associated with the email generated a hit, the email 325 itself did not match each constraint in the set of constraints. Moreover, the other attachments associated with the document family 320 do not include the hit indicator because those attachments did not match each constraint in the set of constraints.

Figure 4:
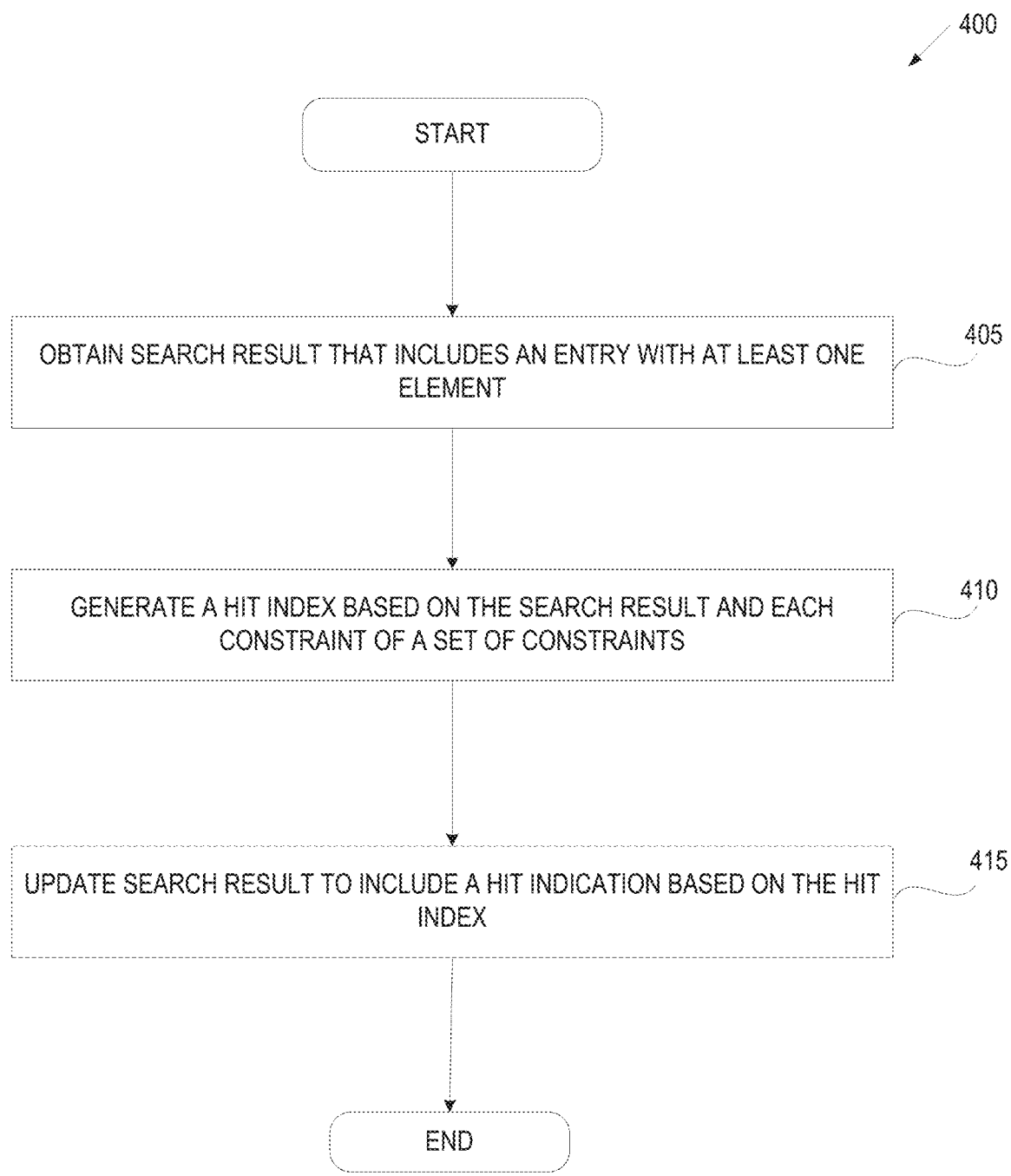
FIG. 4 is a flow diagram for a method of providing an indicator of a search hit, in accordance with an embodiment.

FIG. 4 is a flow diagram of an embodiment of a method 400 for providing an indicator of a search hit. The method 400 is performed by processing logic that may comprise hardware (circuitry, dedicated logic, etc.), software (such as is run on a general purpose computer system or a dedicated machine), or a combination of both.

At block 405, processing logic obtains a search result that includes a document family. The document family includes one or more elements and is a representation of an electronic discovery document. Each element in the document family can be a distinct part of an electronic discovery document. For example, an electronic discovery document that is an electronic mail item (email) can be represented as a document family including an email message element, an email attachment element for each attachment associated with the email, and an email embedding element for each embedding associated with the email. In another example, an electronic discovery document that is a file can be represented as a document family including a file embedding element associated with the file. Each element can represent a single item in a search system.

The search result can be obtained from running the search in a search system using a set of constraints. In one embodiment, the constraints are a set of search constraints provided by a user of a search system to use when performing the search. The set of constraints can include keywords, a date range, a participant, a language, a file size, a tag, etc. In one embodiment, the search system maintains an email index including an identifier for each email in the search system and an identifier for each file in the search system, and an attachment index including an identifier for each attachment in the search system. In one embodiment, the search is performed in the search system using the set of constraints against the email index and the attachment index. The search result can include a document family associated with an element that matches an identifier in the email index or an identifier in the attachment index.

At block 410, processing logic generates a hit index based on the search results and each of the constraints in the set of constraints. The index can represent the elements in the document family included in the search result that match each of the constraints. For example, the set of search constraints includes constraints A, B, and C and the search results includes a document family with elements 1, 2, and 3. If element 3 matched constraints A, B, and C, but elements 1 and 2 did not, the hit index will include only element 3. The hit index can include an identifier for each element that specifically matched each of the constraints in the set of constraints. One embodiment of generating a hit index based on the search result and each of a set of constraints is described below in reference to FIG. 5.

At block 415, the search result is updated to include a hit indication based on the hit index. The search result can be updated to include an indication based on the index by determining, for each document family (or entry) in the search result, an element associated with the document family that matches the hit index. Processing logic can determine an element associated with the document family that matches the hit index by comparing an item identifier of each element associated with the document family to the entries in the hit index. For example, if a document family includes an email with attachment A and attachment B, the item identifier for the email will be compared to the hit index, the item identifier for attachment A will be compared to the hit index, and the item identifier for attachment B will be compared to the hit index. In one embodiment, if the hit index is a list of identifiers, processing logic compares the item identifier of each element the document family to the item identifiers in the index. If there is a match, processing logic determines that the element whose item identifier matched the hit index is the element that caused the document family to be included in the search result, and is therefore the hit. In another embodiment, if the hit index is a group of bits corresponding to item identifiers, processing logic determines whether a bit associated with the item identifier is set (e.g., equals 1). If the bit for the item identifier is set, processing logic determines that the item identifier associated with the element is associated with the index and the element caused the document family to be included in the search result, and is therefore a hit.

If the item identifier associated with the element is associated with the index, the search result can be updated to include an indication for the document family of the hit as well as the element in the document family that caused the hit. The updated search result can be provided in a user interface. The user interface can display the updated search result including a visual indication associated with each element that was a hit for each entry in the updated search result. Processing logic can provide the updated search result to a user. For example, a search result includes an email document family with a message element and attachment elements A and B; attachment A was a hit. In this example, the search result is updated to indicate attachment A caused the email document family to be included in the search result. Processing logic can cause the search result to be displayed in a user interface. The user interface can display the search result by displaying the document family and an indicator (e.g., visual indicator) in proximity to the element associated with the document family that matched the set of constraints. Using the previous example, the search result will display the email document family including the email message, attachment A, and attachment B. Attachment A will include a visual indicator to visually indicate that Attachment A matched the set of search constraints. An exemplary user interface is described above in reference to FIG. 3.

Figure 5:
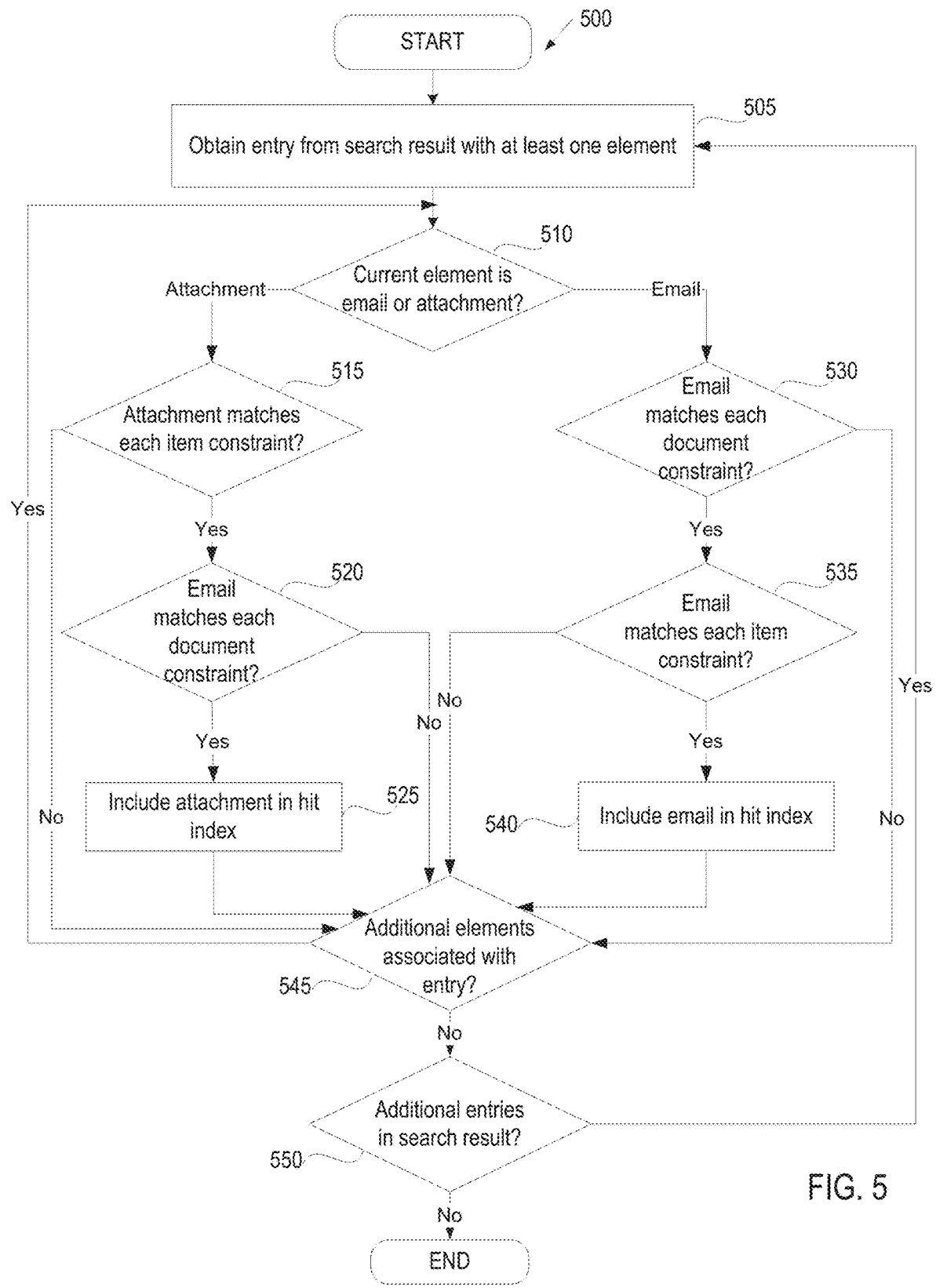
FIG. 5 is a flow diagram for a method of generating an index based on search results and a set of constraints, in accordance with an embodiment.

FIG. 5 is a flow diagram of an embodiment of a method 500 for generating an index based on a search result and each of a set of constraints. The method 500 is performed by processing logic that may comprise hardware (circuitry, dedicated logic, etc.), software (such as is run on a general purpose computer system or a dedicated machine), or a combination of both.

At block 505, processing logic obtains an entry from search result with at least one element. Processing logic can obtain the entry from the search result by accessing the search result and reading the first entry in the search result that has at least one element.

At block 510, processing logic determines whether the current element is an email or an attachment. Processing logic can determine whether the element is an email or an attachment based on a type associated with the element. If the element is an email, the method 500 proceeds to block 530. If the entry in the search result is an attachment, the method 500 proceeds to block 515.

At block 515, processing logic determines if the attachment matches each item constraint in a set of constraints associated with the search result. An item constraint is a constraint that can be applicable to each element in a document family. An item constraint can be a tag constraint, a prediction, a file type, etc. For example, a search result includes an entry that is an email with 4 attachments, and only a single attachment is tagged as responsive. If a search result has an item constraint of the tag being responsive, the single attachment tagged as responsive will match or meet the item constraint. Processing logic can determine if the attachment matches each item constraint associated with the search by comparing the constraints of the attachment with each of the item constraints. If the attachment matches each of the one or more item constraints, the method 500 proceeds to block 520. If the attachment does not match each item constraint, the method 500 ends and the attachment (element) is not added to the hit index.

At block 520, processing logic determines if an email associated with the attachment matches each document constraint in a set of constraints associated with the search result. A document constraint can be a search constraint that is only applicable to an email. Document constraints can include a sender of the email, a recipient of the email, a custodian of the email, a date of the email, etc. If an email matches or meets a document constraint, all elements (e.g., attachments, embeddings) associated with the email automatically meet the document constraint. For example, a user searches for sender A. In this example, if an email was sent by sender A and includes attachment B and attachment C, attachment B and attachment C meet or match the document constraint because the email including those attachments was sent by sender A. Processing logic can determine if an email associated with the attachment matches each of the one or more document constraints by comparing the constraints of the email with each document constraint in the set of constraints associated with the search result. If the email associated with the attachment matches each of the one or more document constraints, the method 500 proceeds to block 525. If the email associated with the attachment does not meet or match each document constraint, the method 500 proceeds to block 545.

At block 525, processing logic includes the attachment in the hit index. Processing logic can include the entry in the attachment in the hit index by determining a unique identifier for the attachment and updating the index to be associated with the unique identifier (e.g., set a bit in the hit index corresponding to the unique identifier, include the unique identifier in the hit index, etc.). In some embodiments, an attachment can appear more than once for a particular email, thus requiring a unique identifier for each attachment in the email. For example, an email with two instances of attachment A will need a unique identifier for the first instance of attachment A and a unique identifier for the second instance of attachment A.

In one embodiment, processing logic determines the unique identifier by accessing the identifiers in the email index and generating the unique identifier based on the identifiers in the email index. For example, an email index has 10 emails with index identifiers ranging from 377837964787712 to 377837964787722. In this example, processing logic determines the unique identifier for the first email as 1, the unique identifier for the second email as 2, and the unique identifier for each successive email in an incremental fashion (e.g., 3, 4, etc.). In an alternate embodiment, processing logic determines the unique identifier by assigning the unique identifier based on an email identifier corresponding to the email associated with the attachment, an attachment identifier and an ordinal value of each attachment identifier. The ordinal value can be a value associated with an attachment. For example, if an email has 2 attachments, the ordinal value of the first attachment is 1 and the ordinal value of the second attachment is 2. In one embodiment, processing logic assigns the unique identifier by concatenating the email identifier corresponding to the email associated with the attachment, the attachment identifier, and an ordinal value of each attachment identifier. In an alternate embodiment, processing logic assigns the unique identifier by combining the email identifier corresponding to the email associated with the attachment, the attachment identifier, and an ordinal value of each attachment identifier. In another alternate embodiment, processing logic assigns the unique identifier by incrementing the email identifier by a predefined value (e.g., by the ordinal value, the email identifier, 1, 2, etc.). For example, email A has attachments B1 and B2, which are the same attachment B repeated twice. In this example, email A has an email identifier 377837964787715, attachment B has an attachment identifier 377837964788617 (therefore, B1 and B2 will have the same attachment identifier 377837964788617), attachment B1 has an ordinal value of 1, and attachment B2 has an ordinal value of 2. In this example, email A is assigned a unique identifier 101 and attachments B1 and B2 are assigned unique identifier 102 and 103, respectively. The unique identifier 102 for attachment B1 is assigned based on the unique identifier 101 assigned to the email associated with the attachment B1 and the ordinal value of B1 (377837964787715, 377837964788617, 1). The unique identifier 103 is assigned based on the unique identifier 101 assigned to the email associated with the attachment B2 and the ordinal value of B2 (377837964787715, 377837964788617, 2).

At block 530, if the current element is an email, processing logic determines if the email matches each document constraint associated with the search result. Processing logic can determine if an email matches each document constraint by comparing the constraints of the email with each document constraint. If the email matches each document constraint, the method 500 proceeds to block 535. If the email does not match each document constraint, the method 500 proceeds to block 545

At block 535, processing logic determines if the email matches each item constraint in a set of constraints associated with the search result. Processing logic can determine if the email matches each item constraint by comparing the constraints of the email with each item constraint. If the email matches each of the item constraints, the method 500 proceeds to block 540. If the email does not match each item constraint, the method 500 proceeds to block 545.

At block 540, processing logic can include the email in the hit index. To include the email in the hit index, processing logic can convert the email to a corresponding item identifier and update the index to be associated with the item identifier (e.g., set a bit in the index corresponding to the item identifier, include the item identifier in the index, etc.). The item identifier can be an identifier specific to the email and can be stored in an email index. Processing logic can convert the email to a corresponding item identifier by accessing the identifiers in the email index and generating the item identifier based on the email identifiers. Processing logic can generate the item identifier based on the email identifiers as a value that is different than all of the email identifiers in the email index. For example, if the email index email identifiers ranging from 377837964787712 to 377837964787722, processing logic generates the item identifier for the email as a value that is different than each of the values ranging from 377837964787712 to 377837964787722, such as the value 101.

At block 545, processing logic determines if there are additional elements associated with the current entry in the search result. If there are additional elements associated with the current entry in the search result, the method 500 returns to block 510 to determine if the next element associated with the current entry is an email or an attachment. If there are no additional elements associated with the current entry in the search result, the method 500 proceeds to block 550.

At block 550, processing logic determines if there are additional entries in the search result. Processing logic can determine if there are additional entries in the search result by accessing the search result and determining if all the entries have been accessed. If there are additional entries in the search result, the method 500 returns to block 505 to obtain an additional entry from the search result that has at least one element. If there are no additional entries in the search result, the method 500 ends.

Figure 6:
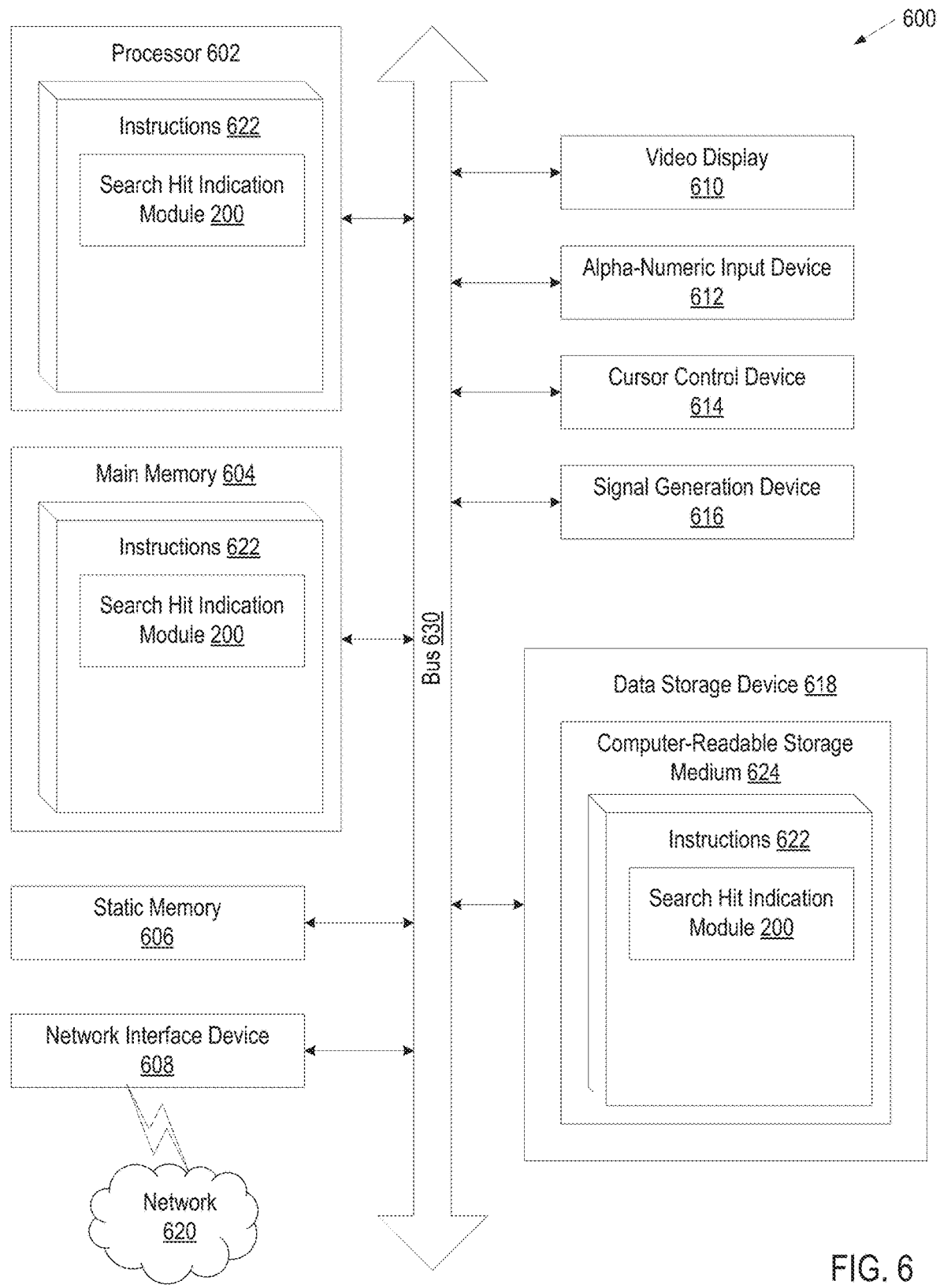
FIG. 6 is a block diagram of an exemplary computer system that may perform one or more of the operations described herein.

FIG. 6 illustrates a diagram of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 624 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one embodiment, the instructions 622 include instructions for a search hit indication module (e.g., search hit indication module 200 of FIG. 2) and/or a software library containing methods that call a search hit indication module. While the computer-readable storage medium 624 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that causes the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "calculating," "providing," "receiving," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by at least one computer processor of a computer system, a search result comprising at least one entry that corresponds to an email document, wherein the search result is received as an output of a search that is run in the computer system based on a set of a plurality of search constraints including a set of a plurality of document search constraints and a plurality of item search constraints, wherein the computer system maintains an email index including an identifier for each email in the computer system and an identifier for each file in the computer system and an attachment index including an identifier for each attachment associated with the email document;

generating, by the at least one computer processor, a hit index based on the search result and each constraint in the set of a plurality of search constraints, the hit index comprising identification information to identify an attachment, from a set of attachments, that exactly matches each search constraint of the set of a plurality of document search constraints and the hit index further comprising identification information to identify each email, from a set of emails that matches each item search constraint of the plurality of item search constraints; and generating a user interface showing: 1) a listing of at least one attachment element identifier for an attachment of the email document and providing a visual indictor hit icon, separate and distinct from an attachment icon identifying the attachment that exactly matches each document search constraint of the set of a plurality of search constraints and 2) a listing of emails and providing a visual hit indicator hit icon, separate from an email element identifier, identifying each email that matches each item search constraint;

wherein a visual hit icon is provided for emails matching each of the plurality of item search constraints and a visual hit icon is provided for attachments exactly matching each of the plurality of document search constraints.

2. The method of claim 1 wherein generating the hit index based on the search result and each constraint in the set of a plurality of search constraints comprises:

upon determining that the entry is the attachment and the set of a plurality of search constraints comprises an item constraint, determining whether the attachment matches the item constraint;

upon determining that the attachment matches the search constraint and the search constraint comprises a document constraint, determining whether an email associated with the attachment matches the document constraint; and upon determining that the email associated with the attachment matches the document constraint, including the attachment in the hit index.

3. The method of claim 2, wherein including the attachment in the hit index comprises:

determining the identifier for the attachment; and
updating the hit index to be associated with the identifier for the attachment.

4. The method of claim 1, wherein generating the hit index comprises;

upon determining that the email matches a document constraint and the set of a plurality of search constraints comprises an item constraint, determining whether the email matches the item constraint; and upon determining that the email matches the item constraint, including the email in the hit index.

5. The method of claim 4, wherein including the email in the hit index comprises:

converting the email to a corresponding item identifier; and
updating the hit index to be associated with the corresponding item identifier.

6. The method of claim 1, wherein the visual indicator hit icon includes a textual component signifying a hit.

7. A non-transitory computer-readable storage medium for providing an indicator of a search hit in a computer system, wherein the non-transitory computer-readable storage medium has instructions that, when executed by at least one computer processor of a computer system, cause the at least one computer processor to perform operations comprising:

receiving a search result comprising at least one entry that corresponds to an email document, wherein the search result is received as an output of a search that is run in the computer system based on a set of a plurality of search constraints including a set of a plurality of document search constraints and a plurality of item search constraints, wherein the computer system maintains an email index including an identifier for each email in the computer system and an identifier for each file in the computer system and an attachment index including an identifier for each attachment associated with the email document;

generating a hit index based on the search result and each constraint in the set of a plurality of search constraints, the hit index comprising identification information to identify an attachment, from a set of attachments, that exactly matches each search constraint of the set of a plurality of document search constraints and the hit index further comprising identification information to identify each email, from a set of emails that matches each item search constraint of the plurality of item search constraints; and generating a user interface showing: 1) a listing of at least one attachment element identifier for an attachment of the email document and providing a visual indictor hit icon, separate and distinct from an attachment icon, identifying the attachment that exactly matches each document search constraint of the set of a plurality of search constraints and 2) a listing of the emails and providing a visual hit indicator hit icon, separate from an email element identifier, identifying each email that matches each item search constraint;

wherein a visual hit icon is provided for emails matching each of the plurality of item search constraints and a visual hit icon is provided for attachments exactly matching each of the plurality of document search constraints.

8. The non-transitory computer-readable storage medium of claim 7, wherein generating the hit index based on the search result and each constraint in the set of search constraints comprises:

upon determining that the entry is the attachment and the set of a plurality of search constraints comprises an item constraint, determining whether the attachment matches the item constraint;

upon determining that the attachment matches the set of plurality of search constraints including a document constraint, determining whether an email associated with the attachment matches the document constraint; and upon determining that the email associated with the attachment matches the document constraint, including the attachment in the hit index.

9. The non-transitory computer-readable storage medium of claim 8, wherein including the attachment in the hit index comprises:

determining the identifier for the attachment; and
   updating the hit index to be associated with the identifier for the attachment.

10. The non-transitory computer-readable storage medium of claim 7, wherein generating the hit index based on the search result and each constraint in the set of a plurality of search constraints comprises:

upon determining that the entry is an email and the set of a plurality of search constraints comprises a document constraint, determining whether the email matches the document constraint;
   upon determining that the email matches the document constraint and the set of a plurality of search constraints comprises an item constraint, determining whether the email matches the item constraint; and
   upon determining that the email matches the item constraint, including the email in the hit index.

11. The non-transitory computer-readable storage medium of claim 10, wherein including the email in the hit index comprises:

converting the email to a corresponding item identifier; and
   updating the hit index to be associated with the corresponding item identifier.

12. The non-transitory computer-readable storage medium of claim 7, wherein the visual indicator hit icon includes a textual component signifying a hit.

13. A system for providing an indicator of a search hit comprising:

a memory; and
   at least one computer processor of the computer system coupled to the memory, wherein the at least one computer processor is configured to:
      receive, at the least one computer processor, a search result comprising at least one entry that corresponds to an email document, wherein the search result is received as an output of a search that is run in the computer system based on a set of a plurality of search constraints including a set of a plurality of document search constraints and a plurality of item search constraints, wherein the computer system maintains an email index including an identifier for each email in the computer system and an identifier for each file in the computer system and an attachment index including an identifier for each attachment associated with the email document;
      generate a user interface showing: 1) a listing of at least one attachment element identifier for an attachment of the email document and providing a visual indicator hit icon, separate and distinct from an attachment icon, identifying an attachment that exactly matches each document search constraint of the set of a plurality of search constraints and 2) a listing of the emails and providing a visual hit indicator hit icon, separate from an email element identifier, identifying each email that matches each item search constraint; and
      wherein a visual hit icon is provided for emails matching each of the item constraints in the plurality of item constraints and a visual hit icon is provided for attachments exactly matching each of the plurality of document search constraints.

14. The system of claim 13, wherein the at least one computer processor is configured to:

upon determining that the entry is the attachment and the set of a plurality of search constraints comprises an item constraint, determine whether the attachment matches the item constraint;
   upon determining that the attachment matches the search constraint and the search constraint comprises a document constraint, determine whether an email associated with the attachment matches the document constraint; and
   upon determining that the email associated with the attachment matches the document constraint, include the attachment in the hit index.

15. The system of claim 13, wherein the at least one computer processor is configured to:

upon determining that the entry is an email and the set of a plurality of search constraints comprises a document constraint, determine whether the email matches the document constraint;
   upon determining that the email matches the document constraint and the set of a plurality of search constraints comprises an item constraint, determine whether the email matches the item constraint; and
   upon determining that the email matches the item constraint, include the email in the hit index.

16. The system of claim 13, wherein the visual indicator hit icon includes a textual component signifying a hit.

\* \* \* \* \*